US005425099A

United States Patent [19]

[11] Patent Number: 5,425,099

Takakura et al.

[45] Date of Patent: * Jun. 13, 1995

[54] POSITIVE TEMPERATURE COEFFICIENT THERMISTOR DEVICE

[75] Inventors: Kenji Takakura; Katsuyuki Uchida, both of Nagaokakyo, Japan

[73] Assignee: Murata Mfg. Co., Ltd., Japan

[ * ] Notice: The portion of the term of this patent subsequent to May 24, 2011 has been disclaimed.

[21] Appl. No.: 223,647

[22] Filed: Apr. 6, 1994

Related U.S. Application Data

[63] Continuation of Ser. No. 850,698, Mar. 11, 1992, Pat. No. 5,315,652.

[30] Foreign Application Priority Data

Mar. 13, 1991 [JP] Japan .................................. 3-14382

[51] Int. Cl.$^6$ .............................................. H04M 9/08

[52] U.S. Cl. .................................. 379/413; 379/412; 379/387; 379/331; 361/117; 361/118; 361/119; 338/22 R; 338/22 SD

[58] Field of Search ............... 379/413, 412, 387, 331; 361/117, 118, 119; 338/22 R, 22 SD

[56] References Cited

U.S. PATENT DOCUMENTS

| | | | |
|---|---|---|---|
| 4,937,435 | 6/1990 | Goss et al. | 338/22 R |
| 4,992,771 | 2/1991 | Caporali et al. | 338/22 |
| 5,315,652 | 5/1994 | Takakura et al. | 379/413 |

*Primary Examiner*—James L. Dwyer
*Assistant Examiner*—Jacques M. Saint-Surin
*Attorney, Agent, or Firm*—Ostrolenk, Faber, Gerb & Soffen

[57] ABSTRACT

A positive temperature coefficient thermistor element comprising a plate-shaped ceramic body made of a ceramic material whose Curie temperature is in the range of 60° to 120° C., and having a thickness of 2.5 to 5.0 mm, and electrodes formed on both major surfaces of the ceramic body.

8 Claims, 6 Drawing Sheets

POSITIVE TEMPERATURE COEFFICIENT THERMISTOR DEVICE

This is a continuation of application Ser. No. 07/850,698, filed Mar. 11, 1992, now U.S. Pat. No. 5,315,652.

BACKGROUND OF THE INVENTION

1. Field of the Invention

The present invention relates generally to a terminal for telegraph and telephone systems, and more particularly, to a terminal for telegraph and telephone systems using a positive temperature coefficient thermistor element (hereinafter referred to as a PTC element) as an overvoltage/overcurrent protecting component.

2. Description of the Prior Art

Examples of terminals for telegraph and telephone systems include a telephone set, a facsimile, a PBX (private branch exchange) and the like used on the subscriber's side. Many of the terminals contain a bell circuit and a speaking circuit. More specifically, a bell circuit 1 and a speaking circuit 2 are connected to subscriber's lines 4*a* and 4*b* through hook-switches 3*a* and 3*b*, as shown in FIG. 2. Reference numeral 5 denotes a surge absorbing element, which is constituted by, for example, a varistor and is connected so as to absorb a surge current.

The hook-switches 3*a* and 3*b* are connected to the bell circuit 1, as shown in FIG. 2, at the on-hook time. At the off-hook time, the hook-switches 3*a* and 3*b* are switched so as to be connected to the speaking circuit 2. A voltage applied to the circuits in an interface portion 8 is generally 48 volts. When the terminal starts reception in the connected state shown in FIG. 2, that is, the on-hook state, a bell voltage such as an AC voltage of 75 volts (in the case of Japan) or an AC voltage of 150 volts (in the case of U.S.) is applied, so that a bell begins to ring. When a user takes up a receiver to bring the terminal into the off-hook state, the hook-switches 3*a* and 3*b* are switched so as to be connected to the speaking circuit 2. Accordingly, the supply of the voltage to the bell circuit 1 is cut off, so that the bell stops ringing. Consequently, the speaking circuit 2 is connected to the subscriber's lines 4*a* and 4*b*, so that the terminal enters the speaking state.

However, in the interface portion 6 in the above described terminal, a very large overvoltage may, in some cases, be applied due to a failure, an interconnection error or the like of the terminal. For example, the above described bell voltage may be erroneously applied to the speaking circuit 2 due to a failure, or the interface portion 6 may be erroneously connected to a commercial power supply due to an interconnection error, so that an overvoltage of approximately 200 volts may, in some cases, be applied. In order to provide protection against such an overvoltage, therefore, an overvoltage protecting component as shown in FIGS. 3 and 4 has conventionally been connected to the interface portion 6.

More specifically, not only the surge absorbing element 5 but also a current fuse 7 serving as an overvoltage protecting component is connected to the interface portion 6 comprising the bell circuit and the speaking circuit, as in the construction shown in FIG. 3. Alternatively, a PTC element 8 serving as an overvoltage protecting component is connected to the interface portion 6, as in the construction shown in FIG. 4.

In the construction shown in FIG. 3, when an overvoltage/overcurrent is applied, the current fuse 7 is fused, so that the interface portion 6 in the terminal is protected. Similarly, in the construction shown in FIG. 4, the interface portion 6 is protected by the current limiting function of the PTC element 8.

In recent years, a protecting operation against a very large overvoltage of 600 volts has been required for safety reasons for the terminal for telegraph and telephone systems. The reason for this is to provide protection against a case where a high-voltage line is brought into erroneous contact with a telephone line as a result of a tornado or an earthquake.

In the terminal using the current fuse 7 as an overvoltage/overcurrent protecting component, as shown in FIG. 3, when the terminal is erroneously connected to the commercial power supply or the like due to an interconnection error, the current fuse 7 is fused, to protect the interface portion 6. In addition, when a large overvoltage of 600 volts is applied as described above, the current fuse 7 is also fused, to reliably protect the interface portion 6. Consequently, a requirement of UL1459, which is a standard related to a telegraph and telephone apparatus is satisfied, thereby making it possible to reliably protect the terminal for telegraph and telephone systems.

However, the current fuse 7 used as an overvoltage/overcurrent protecting component has the disadvantage of having no restoring characteristics for the protecting operation. More specifically, every time the current fuse 7 is fused, the current fuse 7 must be replaced with a new current fuse. Consequently, complicated maintenance work must be performed.

On the other hand, in the terminal using the PTC element 8 shown in FIG. 4, the PTC element 8 is an overvoltage/overcurrent protecting component having restoring characteristics for the protecting operation. Accordingly, the above described complicated maintenance work can be omitted. However, the overvoltage/overcurrent protecting component using the conventional PTC element can only protect the interface portion 6 against the erroneous application of the bell voltage and the erroneous connection of the terminal to the commercial power supply of approximately 200 volts. It cannot reliably protect the interface portion 6 against a vary large overvoltage of 600 volts. More specifically, when a very large overvoltage of 600 volts is applied, the PTC element 8 may, in some cases, be short-circuited and destroyed, so that a very large current is applied to the speaking circuit, causing a serious accident such as ignition of the terminal. Consequently, the terminal using the conventional PTC element does not satisfy the requirement of a standard for requiring protection against an overvoltage of 600 volts, for example, a standard of UL1459, CSA or Bellcore.

SUMMARY OF THE INVENTION

An object of the present invention is to provide a terminal for telegraph and telephone systems comprising a protecting component having restoring characteristics for the protecting operation against a low overvoltage of not more than 200 volts and capable of reliably protecting a speaking circuit and the like without causing a serious accident such as ignition even when a very large overvoltage of 600 volts is applied.

The present invention provides a terminal for telegraph and telephone systems comprising an overvoltage/overcurrent protecting component which is constituted by a PTC element, which is characterized in that the above described PTC element comprises a plate-shaped ceramic body made of a ceramic material whose Curie temperature is in the range of 60° to 120° C., and having a thickness of 2.5 to 5.0 mm; and electrodes formed on both major surfaces of the above described ceramic body.

Lead terminals are generally connected by solders to the electrodes on both the major surfaces of the PTC element in the terminal for telegraph and telephone systems according to the present invention so as to make electrical connection to the exterior. In addition, portions of the PTC element, other than the regions of the forward ends of the lead terminals that are led out, are preferably coated with insulating resin.

According to the present invention, a PTC element used as an overvoltage/overcurrent protecting component in a terminal for telegraph and telephone systems is made of a ceramic material having a Curie temperature in the above described particular range, and is constructed so as to have a thickness in the above described particular range. Accordingly, when an overvoltage of 600 volts is applied, the PTC element is reliably destroyed in a layer shape. Consequently, the circuits are in their opened state, thereby protecting the terminal. That is, the circuits are reliably brought into their opened state by destroying the PTC element in a layer shape, thereby making it possible to reliably prevent the occurrence of a serious accident such as ignition.

On the other hand, when an overvoltage of approximately 200 volts or an overvoltage below 200 volts is applied, the circuits are protected by the current limiting function of the PTC element, similarly to the case of the conventional PTC element. The protection by the current limiting function has restoring characteristics, so that no complicated replacing work is required.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
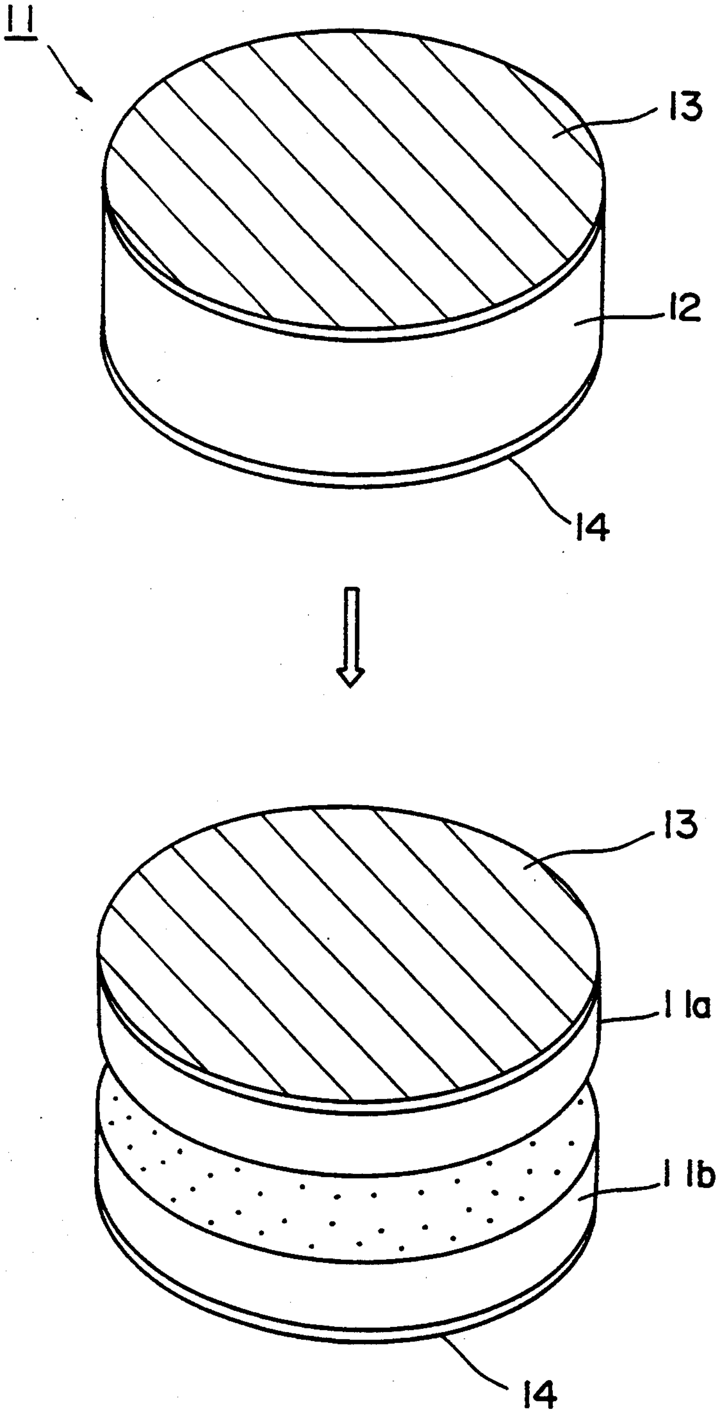
FIG. 1 is a perspective view showing the appearance of a PTC element used in one embodiment of the present invention and a state where the PTC element is destroyed in a layer shape.

FIG. 1 is a perspective view for explaining a PTC element used in the present embodiment and a state where the PTC element is destroyed. A PTC element 11 has a structure in which electrodes 13 and 14 are formed on both major surfaces of a plate-shaped ceramic body 12. The ceramic body 12 is made of a ceramic material whose Curie temperature is in the range of 60° to 120° C. and has a thickness in the range of 2.5 to 5.0 mm.

Figure 2:
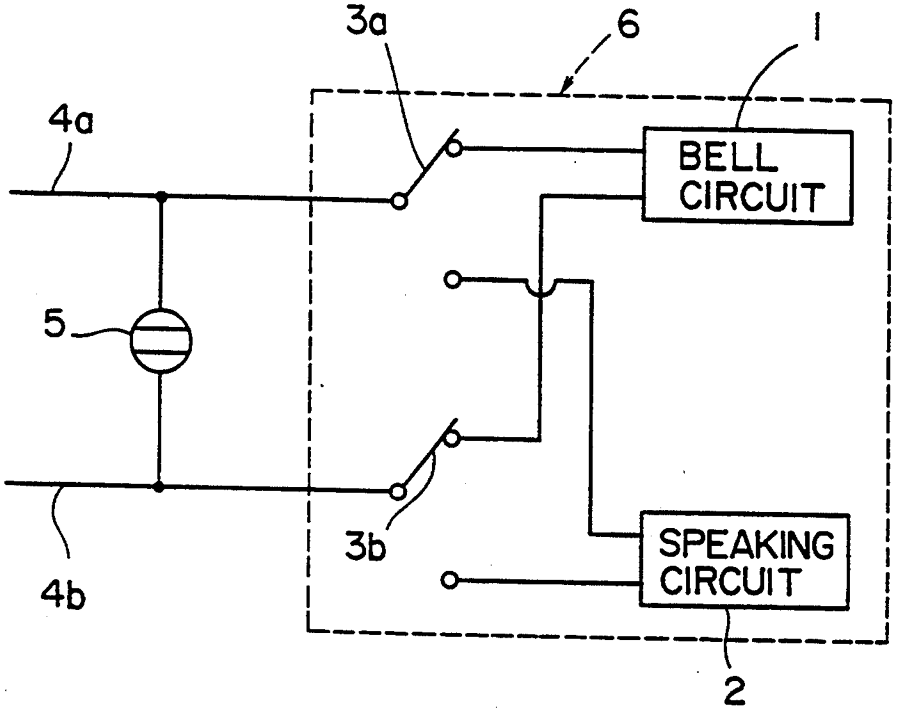
FIG. 2 PRIOR ART
FIG. 2 is a circuit diagram for explaining the outline of a terminal for telegraph and telephone systems.
Figure 3:
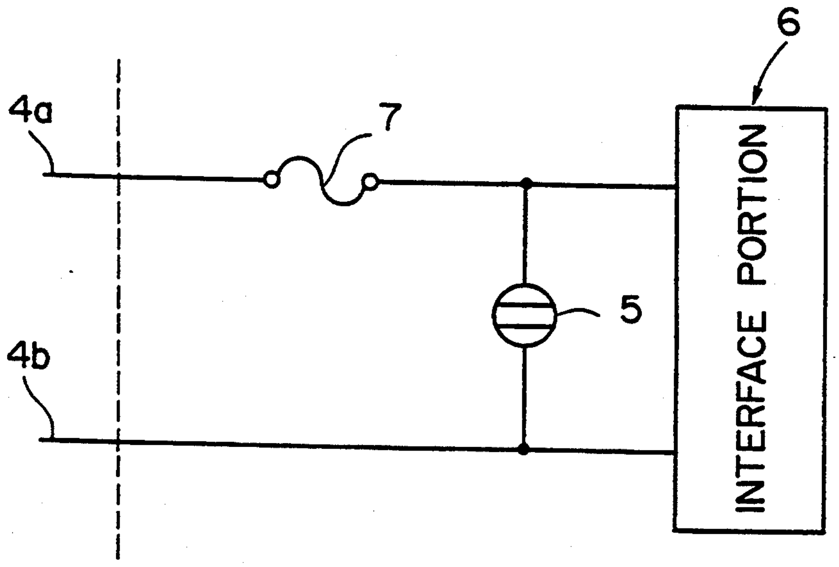
FIG. 3 PRIOR ART
FIG. 3 is a circuit diagram for explaining a conventional terminal for telegraph and telephone systems using a current fuse as an overvoltage/overcurrent protecting component.
Figure 4:
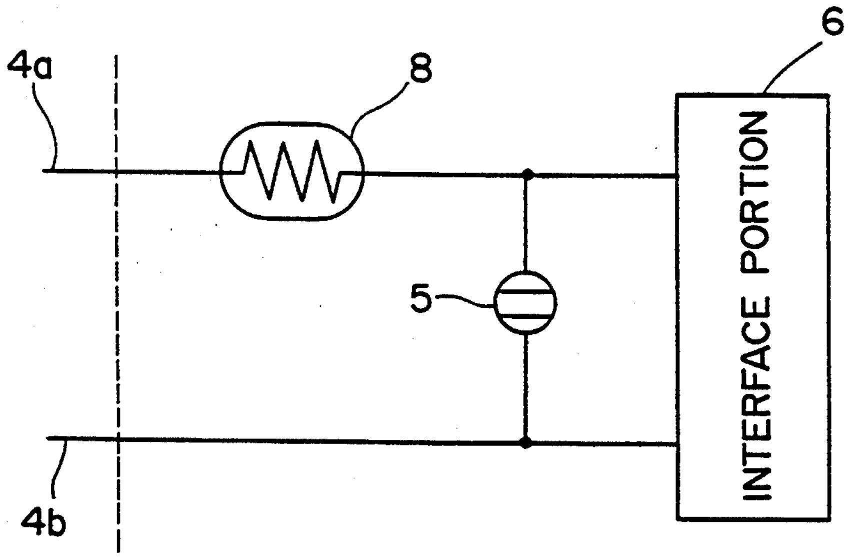
FIG. 4 PRIOR ART
FIG. 4 is a circuit diagram showing a conventional terminal for telegraph and telephone systems using a PTC element as an overvoltage/overcurrent protecting component.

In a terminal for telegraph and telephone systems according to the present embodiment, the above described PTC element 11 is used as an overvoltage/overcurrent protecting component. Specifically, the PTC element 8 in the conventional terminal shown in FIG. 4 is replaced with the above described PTC element 11. Consequently, other circuit portions of the terminal for telegraph and telephone systems are the same as those in the conventional terminal described with reference to FIGS. 2 to 4 and thus, the description thereof is not repeated by incorporating the description of the conventional terminal.

In the terminal for telegraph and telephone systems according to the present embodiment, the above described PTC element 11 is used. Accordingly, protection can be repeatedly provided against an overvoltage of approximately 200 volts, and protection is provided by the destruction of the PTC element 11 into separate layers against a very large overvoltage of 600 volts. This will be described more specifically.

Description is now made of protection against an overvoltage in a case where a bell voltage such as an AC voltage of 75 volts or 150 volts is erroneously applied to a speaking circuit or a case where the terminal is erroneously connected to a commercial power supply of 100 volts or 200 volts. In this case, the speaking circuit and the like are reliably protected by the current limiting function of the PTC element 11, similarly to the case of the conventional PTC element 8. Since the protection by the current limiting function of the PTC element 11 has restoring characteristics, the speaking circuit and the like can be reliably protected many times without replacing the PTC element 11. Consequently, it is possible to protect the terminal without performing complicated maintenance work by the restoring characteristics for the protecting function of the PTC element 11 against an error which is liable to relatively frequently occur such as erroneous connection to the commercial power supply or an interconnection error.

When an overvoltage of 600 volts is applied, the PTC element 11 is destroyed into separate layers, i.e., divided into destroyed pieces **11*a* and 11*b*, as shown in the lower part of FIG. 1. The reason why the PTC element 11 is thus destroyed into separate layers is that the temperature of the PTC element 11 is rapidly raised if the overvoltage is applied, so that a very large temperature difference appears between the surface and the center of the PTC element 11**, resulting into destruction into separate layers due to the difference in thermal expansion therebetween.

As described above, the PTC element 11 is broken into separate layers in a state where it is divided into the destroyed pieces **11*a* and 11*b*. Accordingly, when an overvoltage of 600 volts is applied, the circuits are in their opened state by the destruction of the PTC element into separate layers, so as to protect the terminal. In this case, since the PTC element 11 is destroyed, the PTC element 11 cannot be used again. However, it is very rare that such a very large overvoltage is applied, and the other components cannot usually perform their functions in many cases after such a large overvoltage is applied. Consequently, if a large overvoltage of 600 volts is applied, the other components are also forced to be replaced, so that the restoring characteristics for the protecting function of the PTC element 11 are not particularly required. Accordingly, the terminal is sufficiently protected by the above described destruction of the PTC 11** into separate layers.

As described in the foregoing, according to the present embodiment, the protection against an overvoltage of 600 volts is provided by reliably destroying the PTC element 11 into separate layers. Consequently, when a very large overvoltage of 600 volts is applied, the PTC element 11 must be reliably destroyed into separate layers, as shown in the lower part of FIG. 1. In order to thus destroy the PTC element 11 into separate layers, the ceramic body of the PTC element has a thickness in the range of 2.5 to 5.0 mm and the Curie temperature of the ceramic material composing the ceramic body is in the range of 60° to 120° C., in the present invention. The basis for these aspects of the present invention will be described with reference to FIGS. 5 to 7.

Figure 5:
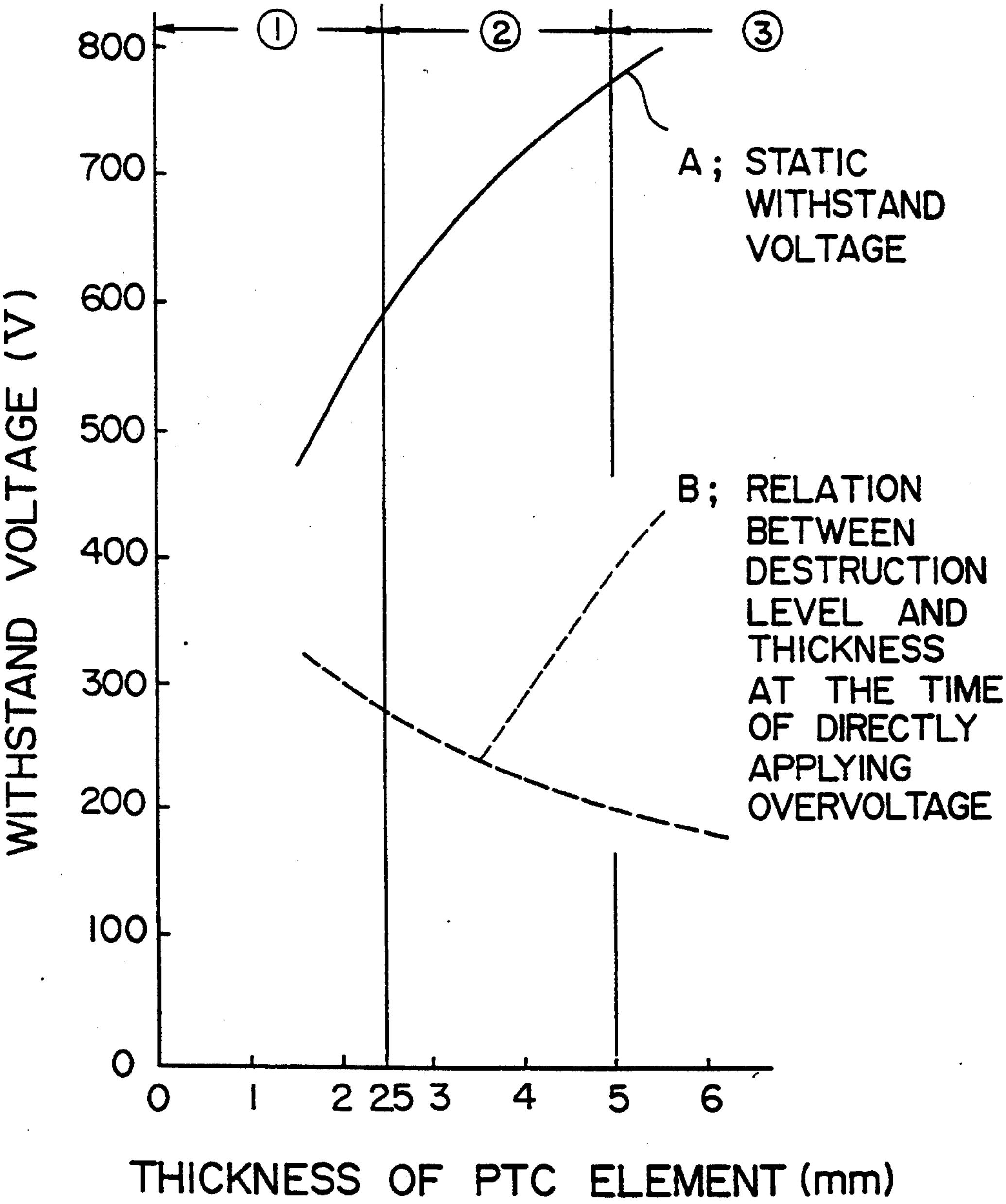
FIG. 5 is a diagram showing the relationship between the thickness of the PTC element and a withstand voltage.

FIG. 5 is a diagram showing the relationship between the thickness of the PTC element 11 and a withstand voltage. (1), (2) and (3) in FIG. 5 respectively indicate a region where the PTC element 11 is liable to be short-circuited and destroyed, a region where the PTC element 11 is destroyed by separating into layers by an overvoltage of 600 volts, while performing the protecting operation by the current limiting function at an overvoltage of 200 volts, and a region where the PTC element 11 is liable to be destroyed into separate layers. As represented by a solid line A in FIG. 5, the larger the thickness of the PTC element 11 is, the higher the static withstand voltage of the PTC element 11 is. In addition, when the thickness of the PTC element 11 is less than 2.5 mm, the static withstand voltage is significantly reduced. If an overvoltage of 600 volts is applied, the PTC element 11 is liable to be short-circuited and destroyed. Consequently, in order to prevent the PTC element 11 from being short-circuited and destroyed when an overvoltage of 600 volts is applied, the thickness of the PTC element 11 is not less than 2.5 mm in the present invention.

On the other hand, if the thickness of the PTC element 11 exceeds 5.0 mm, the PTC element 11 is liable to be destroyed into separate layers. If the thickness of the PTC element is too large, however, the PTC element 11 is destroyed into separate layers even at a voltage significantly lower than 600 volts. More specifically, as obvious from the broken line B in FIG. 5, if the thickness of the PTC element 11 exceeds 5.0 mm, the PTC element 11 is destroyed into separate layers even when an overvoltage of 200 volts is applied. In the present invention, therefore, the thickness of the PTC element 11 is not more than 5.0 mm so as not to destroy the PTC element 11 into separate layers at an overvoltage of approximately 200 volts.

Figure 6:
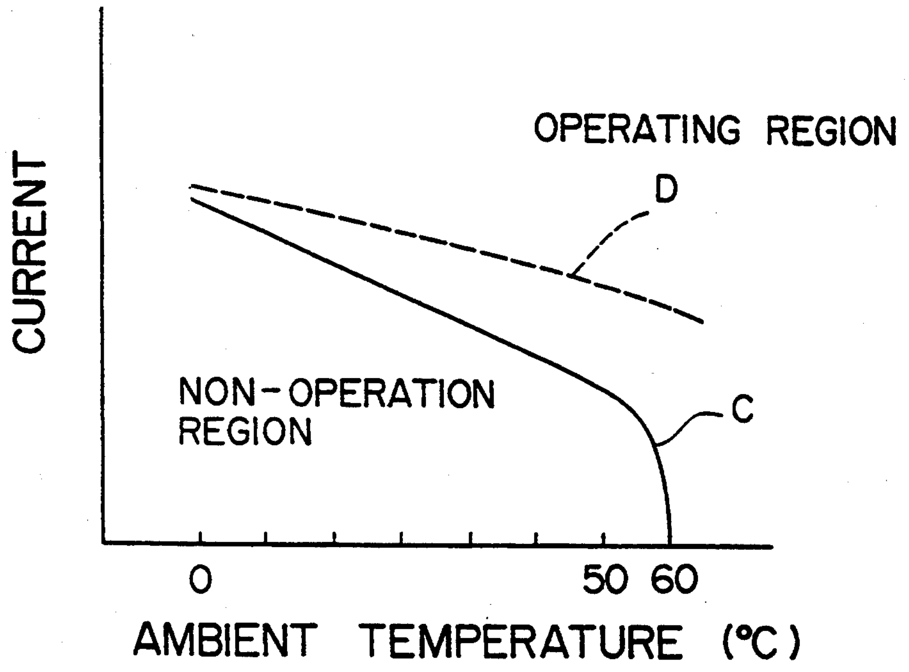
FIG. 6 is a diagram for explaining the relationship between the ambient temperature and a current flowing through the PTC element.
Figure 7:
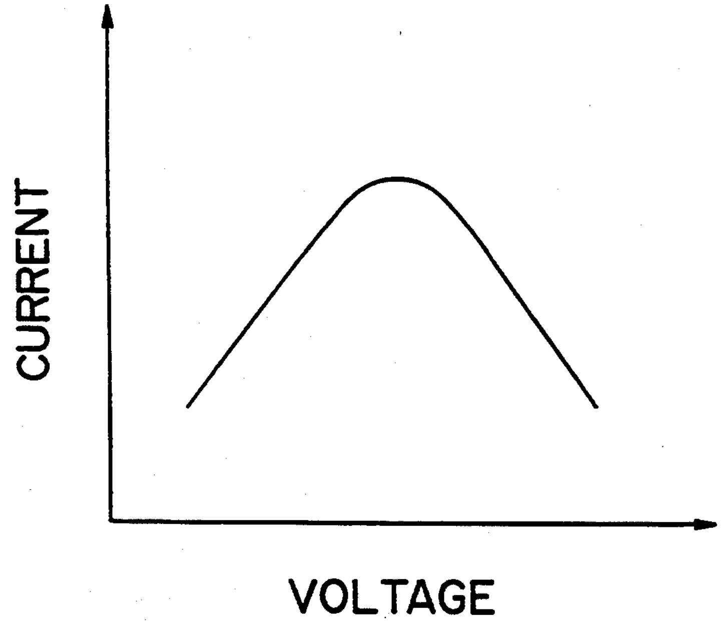
FIG. 7 is a diagram showing current-voltage characteristics of the PTC element.

FIG. 6 is a diagram showing the relationship between a current flowing through the PTC element and the ambient temperature. A solid line C indicates protecting current characteristics in a case where the Curie temperature of the PTC element is 60° C., and a broken line D indicates protecting current characteristics in a case where the Curie temperature of the PTC element is 120° C. Respective regions below the solid line C and the broken line D are non-operating regions of the PTC element, and respective regions above the solid line C and the broken line D are operating regions of the PTC element. The operating regions and the non-operating regions of the PTC element 11 are determined by plotting the crest of a voltage/current characteristic curve for each ambient temperature.

A temperature at which the terminal for telegraph and telephone systems is used, that is, a temperature at which the use must be ensured is generally in the range of −10° to 50° C. Consequently, when the Curie temperature of the PTC element is less than 80° C., the difference from the ambient temperature becomes small. Accordingly, a non-operating current value is liable to be affected by the ambient temperature, as obvious from FIG. 6. Meanwhile, the non-operating current value means the maximum current value at which the current limiting function is not exhibited even if the PTC element 11 is energized.

Consequently, the higher the ambient temperature is, the lower the non-operating current value is, as shown in FIG. 6. That is, the PTC element 11 has such a nature that the non-operating current value is lowered as the ambient temperature approaches the Curie temperature.

On the other hand, the higher the Curie temperature of the ceramic material composing the PTC element 11 is, the higher the temperature of the PTC element 11 is at the time of applying a voltage. Consequently, when the PTC element 11 is made of a ceramic material whose Curie temperature exceeds 120° C., the difference between the ambient temperature and the interior temperature of the PTC element 11 becomes large, so that the PTC element 11 is liable to be broken into separate layers. Accordingly, when the Curie temperature exceeds 120° C., the PTC element 11 is liable to be destroyed into separate layers even at a voltage below 600 volts. In addition, considering a case where an overvoltage of 600 volts is applied, if the temperature of the surface of the PTC element 11 is extraordinarily high, solders bonded to the PTC element 11 are melted, resulting in the possibility that the solders are brought into contact with the other components. Consequently, the Curie temperature of the ceramic material composing the PTC element 11 is not more than 120° C. in the present invention.

As described in the foregoing, according to the present invention, the thickness of the PTC element 11 used and the Curie temperature of the ceramic material composing the PTC element 11 are respectively set to the above described particular ranges, thereby making it possible to reliably destroy the PTC element 11 into separate layers against an overvoltage of 600 volts, while repeatedly protecting the circuits by the current limiting function of the PTC element 11 against an overvoltage of approximately 200 volts.

Although the PTC element 11 shown in FIG. 1 is illustrated as one example of PTC elements used in the present invention, the PTC elements used in the present invention may have shapes other than the plate shape.

Figure 8:
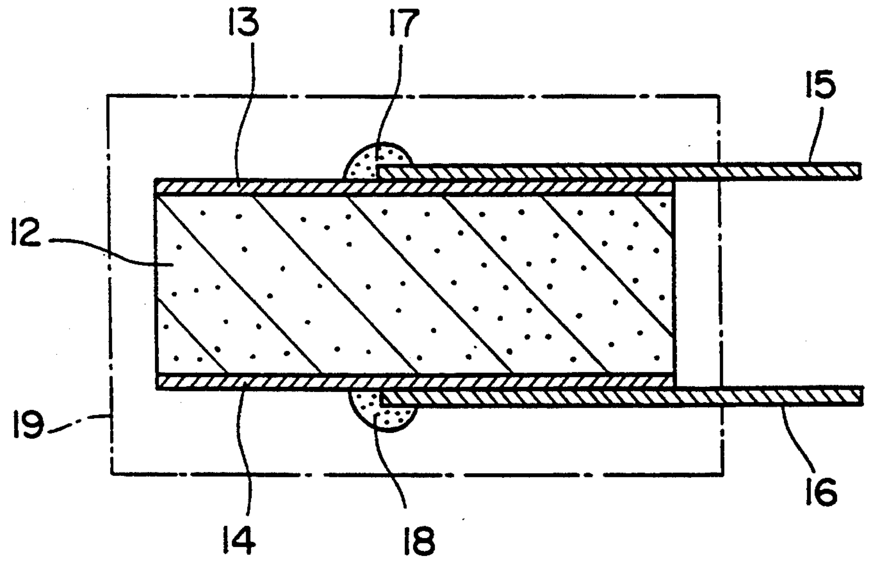
FIG. 8 is a schematic perspective view showing an example in which the PTC element in the terminal for telegraph and telephone systems according to the present embodiment is constructed as a component of the terminal.

Furthermore, the PTC element 11 shown in FIG. 1 is generally used in the form of a component with leads in which lead terminals 15 and 16 are joined to electrodes 13 and 14 on both major surfaces by solders 17 and 18, as shown in FIG. 8. In addition, portions of the PTC element 11, other than the vicinities region, of the forward ends of the lead terminals 15 and 16 that are led out, are preferably coated with insulating resin 19 (the portions where the insulating resin 19 is formed is represented by a one-dot and dash line).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A positive temperature coefficient thermistor element, comprising:

a ceramic body made of a ceramic material whose Curie temperature is in the range of 60° to 120° C., and having a thickness in the range of 2.5 to 5.0 mm; and electrodes formed on both major surfaces of said ceramic body.

2. The positive temperature coefficient thermistor element according to claim 1, wherein said ceramic body separates into layers when a predetermined voltage is applied between said electrodes.

3. The positive temperature coefficient thermistor element according to claim 1, wherein a temperature difference is created between a surface and the center of the ceramic body when a predetermined voltage is applied between said electrodes, thereby separating said ceramic body into layers.

4. A positive temperature coefficient thermistor element having electrodes, the positive temperature coefficient thermistor element comprising:

a ceramic body made of a ceramic material whose Curie temperature is in the range of 60° to 120° C., and having a thickness in the range of 2.5 to 5.0 mm.

5. The positive temperature coefficient thermistor element according to claim 4, wherein the electrodes are formed on both major surfaces of said ceramic body.

6. The positive temperature coefficient thermistor element according to claim 4, wherein said ceramic body separates into layers when a predetermined voltage is applied between the electrodes.

7. The positive temperature coefficient thermistor element according to claim 4, wherein a temperature difference is created between a surface and the center of the ceramic body when a predetermined voltage is applied between the electrodes, thereby separating said ceramic body into layers.

8. The positive temperature coefficient thermistor element according to claim 4, wherein said ceramic body is separated into layers when a voltage of approximately 600 volts is applied between the electrodes.

* * * * *